United States Patent
Gapontsev et al.

(10) Patent No.: US 7,912,099 B2
(45) Date of Patent: Mar. 22, 2011

(54) METHOD AND APPARATUS FOR PREVENTING DISTORTION OF POWERFUL FIBER-LASER SYSTEMS BY BACKREFLECTED SIGNALS

(76) Inventors: Valentin P. Gapontsev, Worcester, MA (US); Eugene Shcherbakov, Burbach (DE); Valentin Fomin, Burbach (DE)

( * ) Notice: Subject to any disclaimer, the term of this patent is extended or adjusted under 35 U.S.C. 154(b) by 79 days.

(21) Appl. No.: 12/288,497

(22) Filed: Oct. 21, 2008

(65) Prior Publication Data
US 2010/0098112 A1  Apr. 22, 2010

(51) Int. Cl.
*H01S 3/30* (2006.01)
(52) U.S. Cl. .................................. 372/6; 372/3
(58) Field of Classification Search .................. 372/3, 6
See application file for complete search history.

(56) References Cited

U.S. PATENT DOCUMENTS

| | | | |
|---|---|---|---|
| 6,212,310 B1 * | 4/2001 | Waarts et al. | 385/24 |
| 6,292,601 B1 * | 9/2001 | Laming et al. | 385/24 |
| 6,310,899 B1 | 10/2001 | Yacobovitz-Veselka et al. | |
| 6,836,488 B2 | 12/2004 | Bayart et al. | |
| 6,895,031 B2 * | 5/2005 | Yamabayashi et al. | 372/92 |
| 7,340,136 B2 * | 3/2008 | Po et al. | 385/123 |
| 2004/0174913 A1 * | 9/2004 | Leplingard et al. | 372/3 |
| 2005/0196093 A1 * | 9/2005 | Grossman et al. | 385/10 |
| 2006/0222307 A1 * | 10/2006 | Walton et al. | 385/124 |

* cited by examiner

*Primary Examiner* — Minsun Harvey
*Assistant Examiner* — Xnning Niu

(57) ABSTRACT

A powerful fiber laser system is configured with at least one filtering element capable of preventing a backreflected Raman component of the main signal from propagating along the upstream stretch of the system. The filtering element includes a slanted fiber grating, one or more cladding formations disposed in a cladding of fiber and having a refractive index greater than that one of the cladding, but lower than a refractive index of the core, and/or a combination of two spaced apart single mode fibers and a low mode fiber spliced to the opposing ends of the respective SM fibers.

15 Claims, 2 Drawing Sheets

FIG. 1
Prior Art
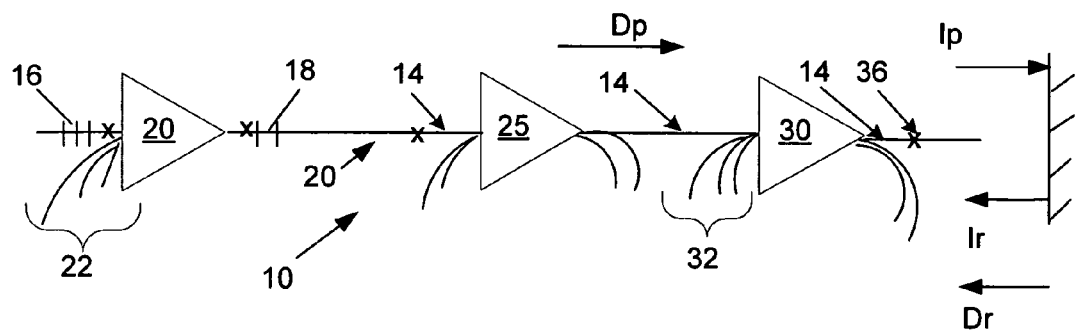
FIG. 2
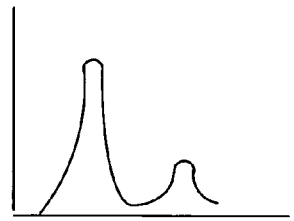
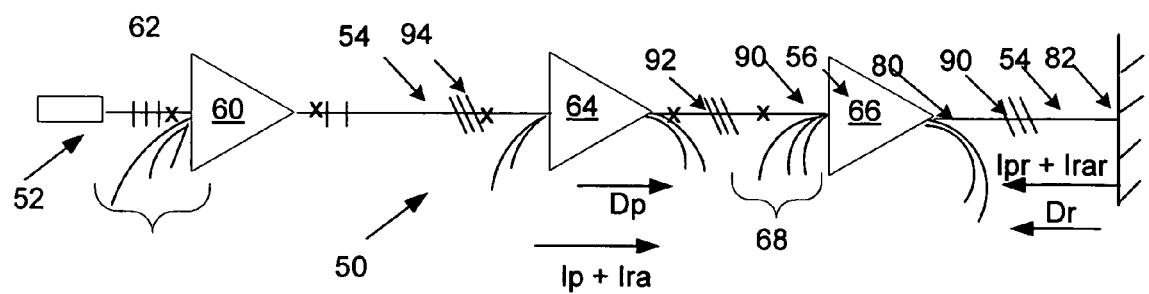
FIG. 3

METHOD AND APPARATUS FOR PREVENTING DISTORTION OF POWERFUL FIBER-LASER SYSTEMS BY BACKREFLECTED SIGNALS

BACKGROUND OF THE INVENTION

1. Field of the Invention

This invention relates to a powerful fiber-laser system having a wavelength-selective filtering unit for filtering undesirable Raman wavelengths which are reflected from internal and external obstacles along a waveguide.

2. Prior Art Discussion

Among numerous applications of powerful laser systems, metal welding and cutting occupies a prominent place. The shipbuilding and car manufacturing industries, which have been employing laser systems for processing metals for quite awhile, favor the laser systems for their efficiency and precision. However, many of the known laser systems used for welding and cutting metals suffer from low reliability. It is not unusual that in a powerful multi-cascaded laser system, at least a few and sometimes all fiber blocks and upstream terminal portion are destroyed during processing the metals.

At least one of the reasons causing a powerful laser system to malfunction during the processing of metals was never a mystery. Once a powerful light, propagating along a waveguide at the desired wavelength, hits an internal interface, such as a splice between fibers, or an external interface, such as a piece of metal, it reflects back and, under certain circumstances, may be launched into the core of a delivery fiber. As the backreflected light is guided backwards along a waveguide through fiber amplifier cascades of the system, it may become sufficiently strong to destroy fiber components. At least one condition should be met so as to produce such an unfortunate result. The power of reflected light is often substantially equal to the power of the incident light.

However, in practice, the power of reflected light propagating at the desired wavelength via, for example, an output amplifying cascade, is typically lower than that one of the forward light because at least part of the direct light signal is scattered upon heating the interface. Furthermore, typically fiber amplifiers operate in a saturated regime preventing uncontrollable increase of the power of the backreflected light. Hence, the power of the backreflected signal alone may not be sufficient to destroy components of a laser system.

Realization that the obvious cause is not solely responsible for the laser system's short life left the specialists in the laser and welding fields puzzled. The extensive research finally produced tangible results showing that, at least partially, non-linear effects associated with powerful laser systems may detrimentally affect the reliability of these systems. The above-identified problem will become readily apparent from the following description.

FIG. 1 shows a powerful laser system 10 including an optical waveguide, typically, silica-based optical fiber laser system which has a multiplicity of alternating passive 12 and active 14 fibers spliced together. The high-and low-reflecting Fiber Bragg Gratings (FBG) 16, 18, respectively, define an optical cavity which receives upstream active fiber 14 and input and output passive fibers 12 spliced to the opposite ends of active 14. The combination of active fiber 14 and passive fiber 12, all located in the cavity, constitutes an oscillator further referred to as a master module 20. The FBGs 16 and 18 are, preferably, but not necessarily, written in respective passive fibers 12 to provide radiation at the desired wavelength. If, for example, master module 20 is configured with an Yb-doped core, the main signal can be lased, for example, at a 1070 nm wavelength. Additional cascades, as for example, an amplifier 25 may be located upstream from output amplifier 30, wherein each amplifier cascade includes a combination of active and passive fibers 14, 12 respectively. The master and amplifier modules 20, 25 and 30 are pumped by respective pump assemblies 22 and 32 operative to launch light in co-propagating, counter-propagating or opposite directions. A single or multiple filters and isolators, not shown but known to one of ordinary skills in the art are operative to attenuate reflected light signal Ir propagating along the waveguide in a reverse direction Dr.

The reflected signal Ir may be propagating in reverse direction Dr upon encountering an internal interface, such as a splice 36, and/or an external interface, for example, a surface 34 of metal to be processed. As reflected light signal Ir propagates in direction Dr at the wavelength of main signal Ip, it is first amplified by downstream amplifier 30 and further by any intermediary amplifier. Upon reaching master module 20, the power of the reflected signal reaches a level capable of destroying all of the components of the waveguide which are located upstream from amplifier module 30 if considered in the direct propagation direction. As mentioned above, however, for a reflected signal to be launched into the waveguide, it has to be mirror-reflected within a micro-or millisecond time period while metal to be processed is not melted yet. Even if this condition is met, an isolator or isolators located along the waveguide are operative to diminish the power of reflected signal to the safe levels.

Referring to FIG. 2 illustrating a spectrum of light emitted by, for example, amplifier module 30, the first power peak represents the main output signal Ip at about 1070 nm wavelength. However, the main signal is not the only one lased by amplifier module 30. Any powerful fiber laser system including continuous wave and pulsed laser systems is always associated with multiple non-linear effects detrimentally affecting the efficiency of these systems. One of the non-linear effects is stimulated Raman scattering—an optical process that involves light radiation at a wavelength(s) longer than the main light signal. In the illustrated spectrum of FIG. 2, one or more weak Raman components Ira 50 of main signal Ip are generated in each of multiple cascades including amplifier module 30 at longer than the desired wavelength(s) and propagate towards the internal or external interface 36 and 34, respectively, of FIG. 1. The power level of first Raman component Ira (let alone successive Raman components) is much less than that one of the main signal. For instance, the main signal may easily reach a level of about 80-100 dB, while the Stokes component may be as weak as about −20 dB at the output of system 10. Seemingly, the latter with such a negligible level of power, when reflected from an interface, cannot jeopardize the safety of system 10. In practice, amplifying module 30, typically working in a saturated regime, greatly amplifies weak signals, such as the reflected Raman component, while the strong reflected main signal Ir is only slightly amplified. Due to considerable lengths of system 10, a backreflected Raman component, further referred to as a backreflected Raman signal, may be devastating for system 10 when coupled to the reflected main signal Ir. In fact, as numerous experiments show, reflected Raman signals may reach up to 60 and even higher dB at the point when it reaches, for example, master module 20 of FIG. 1. Such a powerful signal may be sufficient to destroy fiber components along the upstream stretch of system 10.

A need, therefore, exist for a method of preventing distortion of powerful fiber laser systems by backreflected parasitic signals reflected from internal and external obstacles.

A further need exists for a powerful laser system capable of preventing propagation of parasitic back-reflected signals along the system.

SUMMARY OF THE INVENTION

These needs are satisfied by the method and system taught by the present disclosure. In particular, the disclosed method includes providing at least one filtering element in a core of a single mode (SM) fiber which is located downstream from a fiber gain block of the powerful fiber laser system. The filtering element is configured to couple out the backreflected Raman component from the core into the cladding of the SM fiber. Accordingly, the upstream end of the fiber system is shielded from the backreflected Raman component.

The disclosed system has at least one gain block operative to lase a main signal and a Raman component thereof in a forward direction at respective wavelengths $\lambda m$ and $\lambda r$. Both signals may be reflected back towards the upstream of the system from internal and/or external obstacles and capable of severely damaging fiber components which are located along the upstream. To prevent or minimize the possibility of damaging upstream fiber components, at least one filtering element is configured to pass the backreflected main signal and couple out the backreflected Raman component from the core of the waveguide guiding these signals to the cladding thereof.

In according to one modification, the disclosed filtering component includes one or more slanted fiber gratings configured to block the propagation of the Raman component along the upstream stretch of the disclosed fiber system. A further modification of the disclosed filtering component includes at least one formation in the cladding of the waveguide configured with a refractive index which is higher than that one of the cladding, but lower than that one of the core of the lightguide. Still a further modification of the disclosed filtering component includes a combination of two spaced apart single mode fibers bridged by a length of a low-mode fiber. The geometry and configuration of the SM and MM fibers are selected to provide for coupling out the unwanted backreflected Raman component.

BRIEF DESCRIPTION OF THE DRAWINGS

The above and other features of the disclosure will become more readily apparent from the specific description thereof accompanied by the drawings, in which:

FIG. 1 is a simplified schematic diagram of a typical powerful fiber laser system;

FIG. 2 is a graphical diagram of a typical spectrum of signal in a fiber amplifier cascade of the system of FIG. 1;

FIG. 3 is a simplified schematic diagram of a powerful fiber laser system configured in accordance with the disclosure;

SPECIFIC DESCRIPTION

Figure 4:
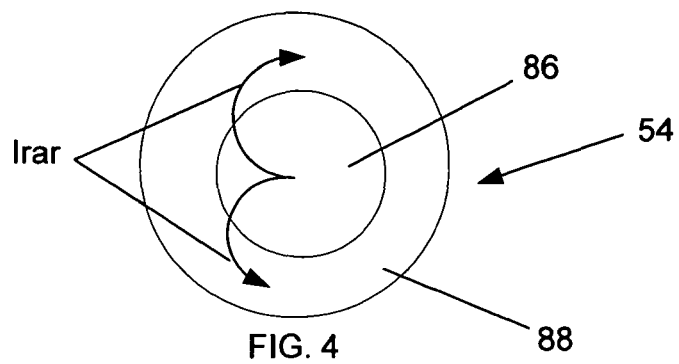
FIG. 4 is a graphical representation illustrating the principle of operation of the disclosed filter of FIG. 3.

Reference will now be made in detail to the disclosed system. Wherever possible, same or similar reference numerals are used in the drawings and the description to refer to the same or like parts or steps. The drawings are in simplified form and are far from precise scale.

FIG. 3 illustrates a powerful fiber laser system 50 used to deliver a powerful output light signal in the order of kW along a waveguide including a plurality of spliced passive and active fibers. Given only as an example, system 50 may be used for welding or cutting metals. The system 50 may include a terminal component 52 located at the upstream end of the system's waveguide.

Two or more strong and weak reflectors, fiber Bragg gratings (FBG), are spaced from one another and define therebetween a resonant cavity which receives a gain block 60 configured from an active fiber, i.e. the fiber which has the core doped with a rare-earth element, such as Yb. Other dopants selected from the well known rare-earth materials, including without any limitation one of Yb—Er, Er, Tm, Nd or any other known rare-earth elements, may be used as well to address the specific needs of the user of system 50. The MM active fiber may be configured, for example, as a double clad fiber, or as an active MM fiber with a W refractive index profile or polarization maintaining fibers. The MM active fiber preferably, but not necessarily, is configured with the core capable of supporting a single mode at the desired wavelength $\lambda m$. Note that other known configurations of the active fibers that may constitute gain block 60 are contemplated within the scope of the present disclosure. The gain block 60 may, for example, include an oscillator or master module operative to generate a main signal Ip at a wavelength $\lambda m$ ranging, for example, between 1010 and 1070 nm or between 1530-1570 nm. The FBGs are written preferably, but not necessarily, in respective passive fibers 54.

The oscillator or master module 60 is operative to convert a pump light at a wavelength $\lambda p$ generated by an upstream pump assembly 62 to the desired output at the $\lambda m$ wavelength, if the pump assembly is provided. The pump assembly 62 may include a plurality of current sources, such as laser diodes, outputting light at 975 or 962 nm pump wavelength. Alternatively, multiple powerful single-mode fiber lasers combined together may constitute pump assembly 62 launching light into one of the claddings of the active fiber in a side-pumping arrangement, which is disclosed in a co-pending application Ser. No. 11/973,473 commonly assigned with the present application and fully incorporated herein by reference.

The system 50 further includes at least one or more fiber amplifying cascades 64 and 66 operative to sequentially amplify the main signal generated by oscillator 60 in the known manner and each based on active fiber 56. The fiber amplifying cascades 64 and 66 each are pumped by a pump 68 in a manner similar to that one of FIG. 1. The main signal Ip is typically accompanied by one or more Raman signal components Ira which may be amplified in successive amplifying cascades 64 and 66, respectively. Depending on the number of cascades and current pump sources associated with each cascade, system 50 may output main signal Ip at the desired wavelength and the desired power of up to a few or more kW, which propagates along the waveguide in a forward direction Dp.

When a cumulative forward signal Ip+Ira propagating along the waveguide encounters internal or external interface 80, 82, respectively, it backreflects along the waveguide in reverse direction Dr with main signal propagating at, for example 1070 nm and Raman signal at 1125 nm. The terminal output amplifier 66 amplifies both signals; however, because of the saturated regime operated by all fiber amplifiers of system 50, a backreflected Raman signal Irar is considerably amplified, whereas a main backreflected signal Ipr is only slightly amplified. Since terminal output amplifier 66 is located at the delivery end, the reflected signals are gaining power as long as they propagate along the waveguide towards oscillator 60. As one of ordinary skills is well aware, the greater the length of the waveguide, the stronger nonlinear effects. The reflected Raman signal Irar may reach a power level of about 60-80 dB by the time it reaches oscillator 60, which is high enough to destroy fiber components of system 50, in particular, those located along the upstream stretch of the waveguide.

Referring to FIG. 4 in addition to FIG. 3, the method and system of system 50 is operative to filter or couple out back-reflected Raman signal Irar from a core 86 of fiber 54 into its cladding 88 (FIG. 4). Accordingly, system 50 is configured to prevent propagation of reflected Raman signal Irar through amplifying cascade 66 (FIG. 3).

In accordance with one embodiment of system 50, a filtering element, such as a slanted fiber Bragg grating (SFBG) 90, is provided in core 86 of SM passive fiber 54 (FIG. 4) downstream of output amplifying cascade 66. Alternatively, SFBG 90 can be provided in axtive fibers constituting gain blocks 60, 64 and 66. The SFBG 90 provides wavelength selectivity and exhibits the absence of back-reflection at the selected filtering wavelength, such as 1125 nm in system 50. The SFBG 90 is tilted during photoinscription with an angle between the grating fringes and the normal of the fiber axis and operative to couple most of the fiber-guided mode at the selected wavelength into radiation modes or cladding modes in reverse direction Dr. The envelope of couplings into the different cladding modes is defined by the specific fiber design and yields the desired filter shape. If single SFBG 90 is not sufficient to yield a satisfying equalization of the amplifier gain, multiple SFBGs can be provided for filtering secondary Raman signals. Thus, a chain of several slanted Bragg gratings (not shown) with different filtering characteristics can be concatenated one after the other to represent a row of spatially succeeding filters.

To further minimize the risk of having upstream fiber components, including, for example, oscillator 60 and terminal part 52 damaged by backreflected Raman signal Irar, single or multiple intermediary SFBGs 92 can be installed downstream from intermediary amplifier 64 in respective passive fibers 54. Even the upstream end of the waveguide can have one or more SFBGs 94 provided in passive fiber 54 upstream from oscillator 60.

Figure 5:
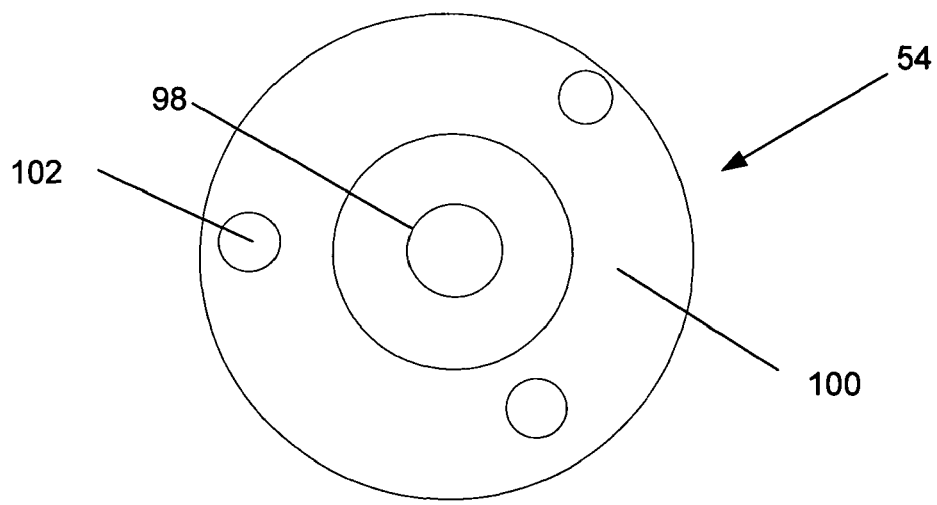
FIG. 5 is a second embodiment of the disclosed filter.

FIG. 5 illustrates a further embodiment of the disclosed fiber filtering element provided along the waveguide of system 50. The filtering element is preferably configured in SM passive fiber 54 having a core 98, which has a relatively high refractive index, and a cladding 100 having a relatively low reflective index.

The cladding 100 has one or more formations 102 which are configured within the cladding so as to result in mode mixing between the cladding mode and core mode at the predetermined wavelength, such as reflected Raman signal Irar at 1025 nm wavelength that is to be removed form core 98. The formation 102 may comprise one or more rings and/or holes. The formations 102 each are configured to have raised refractive index values relative to the majority of remaining material of cladding 100, but the index values are still lower than the raised index of core 98. By selecting the refractive index values and physical properties of formations 102, unwanted reflected Raman signal Irar leaks out of core 98 and is then guided in cladding 100, while reflected main signal Ipr is confined within the core.

Figure 6:
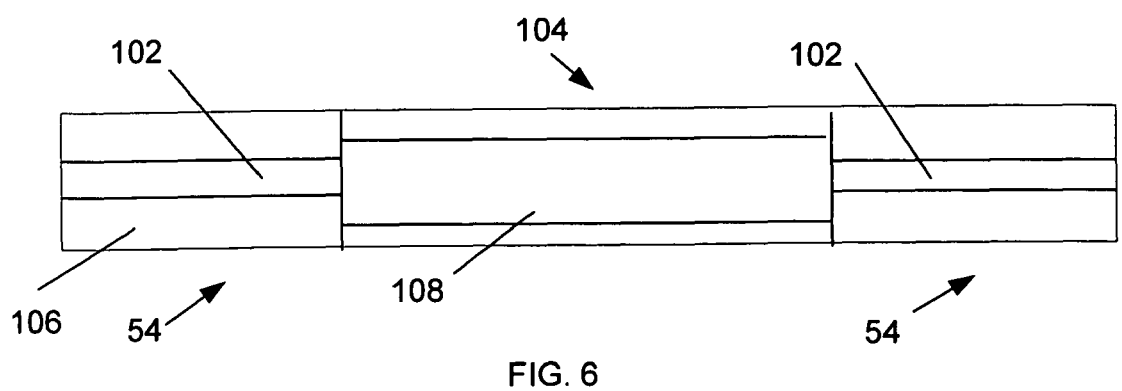
FIG. 6 is a further embodiment of the disclosed filter.

FIG. 6 illustrates a further embodiment of the disclosed filtering element including two spaced apart SM passive fibers 54 and a low-mode (LM) fiber 104 which supports up to 10 modes and is spliced to the opposing ends of the respective SM fibers 54. The SM passive fibers 54 each include a core 102 surrounded by a cladding 106, whereas LM fiber 104 has a core 108 larger than cores 102 of respective SM fibers 54.

The SM fibers 54 each are configured to propagate a fundamental mode of main signal Ip. The LM fiber 104 is capable of propagating multiple modes at the main and Raman wavelengths. The properties of both SM and Lm fibers 54 and 104, respectively, are related such that the optical field distribution resulting from the coherent superimposition of the optical fields of the modes in LM fiber 104 is substantially similar to the optical field of the fundamental mode in SM fiber 54 at the wavelength of main signal Ip or Ipr. As a result, the length of LM fiber 104 can be selected so that reflected main signal Ipr can propagate through the interface (splice) between the SM and LM fibers, whereas reflected Raman signal Irar would be coupled to the cladding.

It will be apparent to those skilled in the art that various modifications and variations can be made in the presently disclosed laser powerful system. Thus, it is intended that the present disclosure cover the modifications and variations of this disclosure provided they come within the scope of the appended claims and their equivalents.

The invention claimed is:

1. A method of preventing distortion of a powerful fiber laser system by a backreflected Raman component of a main signal reflected from an obstacle, the method comprising: providing at least one gain block operative to lase a main signal and a Raman component thereof in a forward direction at respective wavelengths $\lambda m$ and $\lambda r$; providing at least one filtering element in a fiber coupled to a fiber gain block of the powerful fiber laser system so as to pass the backreflected main signal at the $\lambda m$ wavelength and couple out the backreflected Raman component at the wavelength $\lambda r$ from a core into a cladding of the fiber, thereby preventing the backreflected Raman component from propagating through the gain block;

wherein the at least one filtering element includes a slanted Bragg grating (SFBG).

2. The method of claim 1, the fiber being selected from the group consisting of a single-mode passive fiber and a multi-mode active fiber.

3. The method of claim 2 further comprising an additional SFBG written in a core of an additional fiber coupled to an additional fiber gain block.

4. The method of claim 1, wherein the gain block includes an active multi-mode fiber doped with a rare-earth element which is selected from the group consisting Yb, Er, Yb—Er, Tm, and Nd-doped fiber, the gain block being operative to radiate the main signal at a first wavelength and the Raman component at a second wavelength longer than the first wavelength.

5. The method of claim 3, wherein the additional gain block is configured as an amplifying cascade operated in a saturated mode so as to have a first amplifying coefficient for the main signal and a second amplifying coefficient for the Raman component, the first amplifying coefficient being substantially smaller than the second amplifying coefficient.

6. The method of claim 1, wherein the filtering element is provided by
providing a pair of spaced apart single-mode passive fibers downstream from the gain block, and
splicing a predetermined length of a MM fiber to opposing ends of the respective SM fibers, wherein the MM and SM fibers are configured to block the backreflected Raman component.

7. The method of claim 1, wherein the filtering element is configured by providing the core of the fiber with a first refractive index $n_{core}$, wherein the fiber being a single-mode fiber;

providing the cladding of the SM fiber with a second refractive index $n_{clad}$ smaller the $n_{core}$; and providing at least one cladding component disposed within the cladding of the SM fiber and having a refractive index $n_{comp}$ greater than the $n_{clad}$, wherein the cladding component is configured so as to couple out the Raman component from the core of the SM fiber.

8. A powerful fiber laser system comprising:

at least one gain block operative to lase a main signal and a Raman component thereof in a forward direction at respective wavelengths λm and λr, the main signal and Raman component being reflectable from an obstacle as backreflected main and Raman components, respectively, in a reverse direction;

a fiber coupled to the at least one gain block; and at least one filtering element coupled to the fiber and configured to pass the backreflected main signal at the λm wavelength and couple out the backreflected Raman component at the wavelength λr from a core of the fiber to a cladding thereof;

wherein the filtering element is a slanted fiber Bragg grating (SFBG).

9. The powerful fiber laser system of claim 8, wherein the at least one gain block is a fiber laser oscillator.

10. The powerful fiber laser system of claim 9 further comprising:

at least one output amplifying cascade downstream from the laser oscillator;

an additional fiber coupled to the output amplifying cascades; and at least one additional SFBG provided in the additional fiber and configured to prevent propagation of the back-reflected Raman component, wherein the fibers each being configured as a single-mode passive fiber or multimode active fiber.

11. The powerful laser system of claim 8, wherein the core of the fiber has a first refractive index $n_{core}$, the cladding of the fiber having a second refractive index $n_{clad}$ smaller the $n_{core}$, the filtering element being configured with at least one cladding component disposed within the cladding of the fiber and having a refractive index $n_{comp}$ greater than the $n_{clad}$, the cladding component being operative to couple out the back-reflected Raman component from the core of the fiber.

12. The powerful laser system of claim 11, wherein the cladding component is selected from the group consisting of holes, rings and a combination thereof.

13. The powerful laser system of claim 8, wherein the filtering element comprises a predetermined length of a MM fiber coupled to opposing ends of two SM fibers, the MM and SM fibers being configured to block the backreflected Raman component from propagating in the reverse direction.

14. The powerful laser system of claim 8, wherein the backreflected Raman component propagates at a wavelength longer than that one of the main signal.

15. The powerful laser system of claim 8, wherein the at least one obstacle is selected from the group consisting of internal and external obstacles and a combination of these.

* * * * *